United States Patent Office 3,534,084
Patented Oct. 13, 1970

3,534,084
ADAMANTYLAMINO-NAPHTHYLOXYPRO-
PANOLS AND RELATED COMPOUNDS
Venkatachala Lakshmi Narayanan, North Brunswick, and Jack Bernstein, New Brunswick, N.J., assignors to E. R. Squibb & Sons, Inc., New York, N.Y., a corporation of Delaware
No Drawing. Filed Oct. 16, 1968, Ser. No. 768,177
Int. Cl. C07c 91/16, 97/10
U.S. Cl. 260—490   10 Claims

ABSTRACT OF THE DISCLOSURE

This invention relates to new adamantylamino-naphthyloxypropanols and related compounds of the formula

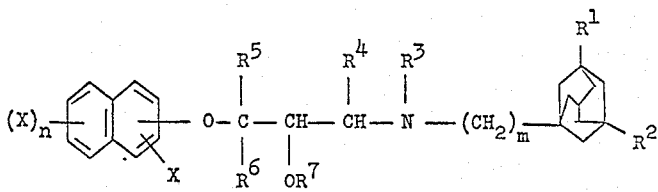

and to salts of such compounds, products which are useful in coronary diseases and as antiviral agents.

SUMMARY OF THE INVENTION

This invention relates to new chemical compounds of the formula (I)

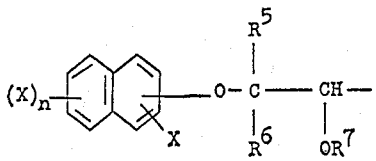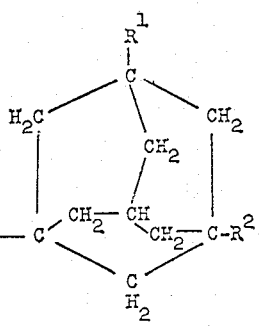

wherein

X is hydrogen, halogen, lower alkyl, halo-lower alkyl, lower alkoxy, lower alkanoyl or di-methylsulfonamido,
$R^1$ and $R^2$ each is hydrogen, lower alkyl or lower alkoxy,
$R^3$ is hydrogen, lower alkyl or phenyl-lower alkyl,
$R^4$, $R^5$ and $R^6$ each is hydrogen or lower alkyl,
$R^7$ is hydrogen or the acyl radical of a hydrocarbon carboxylic acid of less than 14 carbon atoms,
m is 0, 1 or 2 and
n is 1 or 2,
and salts of those compounds.

DETAILED DESCRIPTION OF THE INVENTION

In Formula I, the lower alkyl groups represented by the various symbols include straight and branched chain saturated hydrocarbon groups such as methyl, ethyl, propyl, isopropyl, butyl, isobutyl, t-butyl, amyl and the like. The lower alkoxy groups are oxygen containing radicals of the same character, e.g., methoxy, ethoxy, propoxy, isopropoxy and the like. The lower alkanoyl groups are the acyl radicals of the lower fatty acids containing alkyl groups of the type described, e.g., acetyl, propionyl, isopropionyl, butyryl, isobutyryl and the like. The phenyl-lower alkyl groups also include similar alkyl groups, e.g., benzyl, phenethyl and the like.

All four halogens are included in that term, but chlorine and bromine are preferred. In the halo-lower alkyl groups fluorine is preferred, e.g., trifluoromethyl.

The acyl radicals represented by $R^7$ include lower fatty acid radicals of the type described, as well as long chain fatty acid radicals such as hexanoyl, heptanoyl, decanoyl, dodecanoyl and the like, aryl and aralkanoic acid radicals such as benzoyl, phenacetyl and the like, and 1-adamantane carbonyl and adamantylalkanoyl radicals.

As indicated, the fused ring or the adamantyl ring may each be unsubstituted or contain one or two substituents of the type described. The adamantane ring may be joined directly to the nitrogen atom or through a one or two carbon atom chain.

The various substituents may be the same or different in a given compound.

The compounds of Formula I form acid addition salts with inorganic and organic acids. These acid addition salts frequently provide useful means for isolating the products from reaction mixtures by forming the salt in a medium in which it is insoluble. The free base may then be obtained by neutralization, e.g., with a base such as sodium hydroxide. Then other desired salts may again be formed from the free base and the appropriate inorganic or organic acid. Illustrative are the hydrohalides, especially the hydrochloride and hydrobromide which are preferred, sulfate, nitrate, phosphate, borate, acetate, oxalate, tartrate, maleate, citrate, succinate, benzoate, ascorbate, salicylate, methanesulfonate, benzenesulfonate, toluenesulfonate and the like.

Preferred are those compounds wherein X, $R^1$, $R^2$, $R^3$, $R^4$, $R^5$ and $R^6$ are all hydrogen, $R^7$ is hydrogen or acetyl, m is 0 and n is 1 especially when the side chain is attached to the 1-position of the fused ring.

They are useful as antiviral agents in warm blooded animals, e.g., against influenza virus such as $MHV_3$, by oral or parenteral, e.g., i.p., administration at doses of about 10 to 30 mg./kg./day divided in four to six doses. For example, in mice about 15 mg./kg./day, orally, are used. For this purpose a compound of Formula I or a physiologically acceptable acid addition salt may be incorporated in a conventional dosage form such as tablet, capsule, elixir, injectable or the like along with the necessary carrier material, excipient, lubricant, buffer or the like.

They are also useful as antifibrillatory agents, for example, in arresting cardiac arrhythmia in warm blooded animals, e.g., by inhibition of beta andrenergic receptors in the myocardium. Single or divided doses of about 5 to 25 mg./kg./day, preferably about 4 to 10 mg./kg./day, two to four times daily ($ED_{50}$=15 mg./kg. i.p., $LD_{50}$=122 mg./kg., i.p. in mice) may be administered in dosage forms as described above. They also are useful as antihypertensive agents, e.g., at 1 mg./kg., i.p. in the rat.

The products of Formula I may be produced by either of two methods described below. The symbols have the same meanings defined previously.

According to the preferred method, a naphthol of the formula (II)

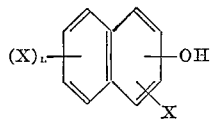

is made to react with an epoxide of the formula (III)

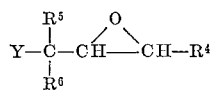

(Y is chlorine or bromine), to obtain a product of the formula (IV)

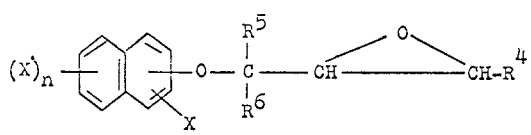

By refluxing the compound of Formula IV with an unsubstituted or substituted adamantylamine of the formula (V)

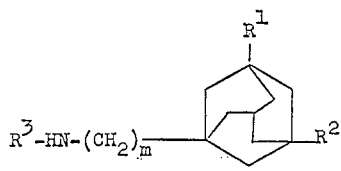

in an inert organic solvent such as n-propanol, benzene or toluene, e.g., for about 16 to 24 hours, yields a product of Formula I wherein $R^7$ is hydrogen. The ester, i.e., wherein $R^7$ is acyl, is obtained by esterifying the product of the foregoing procedure with the appropriate hydrocarbon carboxylic acid, e.g., by refluxing the alcohol (Formula I wherein $R^7$=H) with the appropriate acid in methylene or ethylene chloride as solvent using a trace of sulfuric acid, aryl sulfonic acid or boron-trifluoride as catalyst. In an alternate procedure, the alcohol is heated with the appropriate acid chloride or acid anhydride (obtained from the appropriate hydrocarbon carboxylic acid) in the presence of anhydrous pyridine or sodium acetate. Examples of such acids include acetic acid, propionic acid, isobutyric acid, hexanoic acid, decanoic acid, benzoic acid, phenylacetic acid, 1-adamantane carboxylic acid, 3-methyl-1-adamantaneacetic acid, etc. The acid addition salts may be formed as previously described.

As an alternate method, an adamantylamine of Formula V is reacted with a compound of the formula (VI)

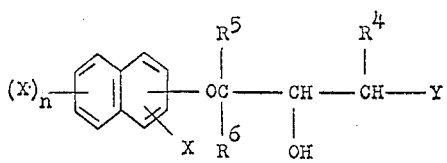

(Y is a halogen, preferably bromine), e.g., by refluxing two equivalents of the compound of Formula V with one equivalent of VI in an organic solvent such as chloroform, benzene, toluene or dimethoxyethane for about 6 to 10 hours.

The compounds of Formula VI are prepared by reacting compounds of Formula IV with a hydrohalic acid, for example, hydrobromic acid.

Adamantylamines of Formula V may be produced by several methods. When $m$ is 0 and $R^3$ is hydrogen, unsubstituted and substituted adamantylamines of the formula (VII)

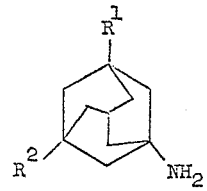

are known, e.g., 1-adamantylamine, 3-methyl-1-adamantylamine, 3-ethyl-1-adamantylamine, 3-methoxy-1-adamantylamine, 3,5-dimethyl-1-adamantylamine, 3,5-dimethoxy-1-adamantylamine and the like, and may be prepared by known methods. When $m$ is 0 and $R^3$ is other than hydrogen they may be prepared from unsubstituted adamantylamines of Formula VII by refluxing the latter with an acid chloride RCOCl or an acid anhydride $(RCO)_2O$. The product of the formula (VIII)

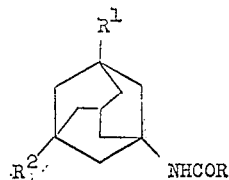

is refluxed in a solvent such as tetrahydrofuran in the presence of a reducing agent such as lithium aluminum hydride to obtain a product of the formula (IX)

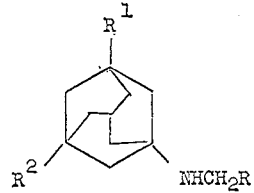

The radical $CH_2R$ is the same as $R^3$.

When $m$ is 1, an unsubstituted or substituted adamantanecarboxylic acid, e.g., 1-adamantanecarboxylic acid, 3-methyl-1-adamantanecarboxylic acid, 3-ethyl-1-adamantanecarboxylic acid, 3-methoxy-1-adamantanecarboxylic acid, 3,5-dimethoxy-1-admantanecarboxylic acid, or the like, is converted to the corresponding acid chloride by reaction with thionyl chloride or oxalyl chloride in benzene to obtain a compound of the formula (X)

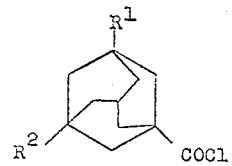

The latter is treated with an amine R³—NH₂ to obtain the amide (XI)

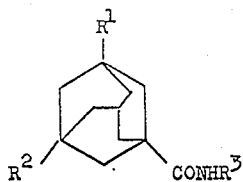

Upon reduction with lithium aluminum hydride in tetrahydrofuran there is obtained (XII)

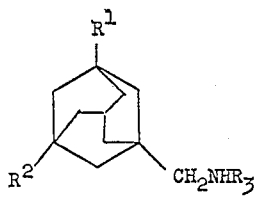

When m is 2, an unsubstituted or substituted 1-bromoadamantane of the formula (XIII)

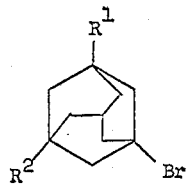

is treated with dichloroethylene and boron trifluoride in an acid such as sulfuric acid to obtain a 1-adamantaneacetic acid of the formula (XIV)

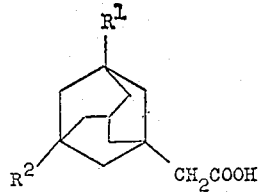

This acid is then processed as described above when m is 1 to give (XV)

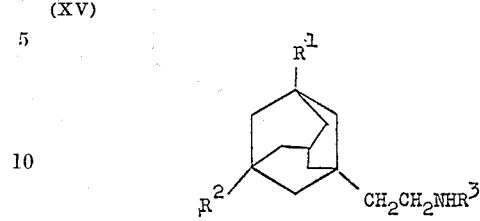

The following examples are illustrative of the invention. All temperatures are on the centigrade scale.

EXAMPLE 1

1-(1-adamantylamino)-3-(1-naphthyloxy-)-2-propanol (a) 1-(2,3-epoxypropoxy)naphthalene.—To a cooled solution of 72 g. (0.5 mole) of α-naphthol and 64 g. (0.7 mole) of epichlorohydrin in 200 ml. of p-dioxane a solution of 24 g. (0.6 mole) of sodium hydroxide in 50 ml. of water is added dropwise. The mixture is refluxed for three hours. After cooling, the solvent is removed in vacuo, and the residue extracted with benzene. The extracts are combined, washed with water, and dried (MgSO₄). The residue obtained after removing the solvent is distilled in vacuo to give 1-(2,3-epoxypropoxy)-naphthalene, B.P. 146–148°/0.9 mm.

(b) 1 - (1-adamantylamino)-3-(1-naphthyloxy)-2-propanol.—A solution of 3.0 g. (0.015 mole) of 1-(2,3-epoxypropoxy)naphthalene and 2.25 g. (0.015 mole) of 1-aminoadamantane in 100 ml. of toluene is refluxed for 16 hours. Evaporation of the solvent in vacuo gives a thick liquid which solidifies on trituration with dry ether to give 1-(1-adamantylamino)-3-(1-naphthyloxy)-2-propanol, M.P. 118°.

(c) 1 - (1-adamantylamino)-3-(1-naphthyloxy)-2-propanol. Alternate method—From 1-chloro-3-(1-naphthyloxy)-2-propanol.—A solution of 1.18 g. (0.015 mole) of 1-chloro-3-(1-naphthyloxy)-2-propanol and 4.5 g. (0.03 mole) of 1-aminoadamantane in 20 ml. of benzene is refluxed for 16 hours. The solvent is removed in vacuo, basified and extracted with chloroform. The residue obtained after removal of chloroform, is crystallized from ether to give 1-(1-adamantylamino)-3-(1-naphthyloxy)-2-propanol.

Following the procedure of Example 1, but substituting for the α-naphthol of part a, the substituted α-naphthol indicated in the first column of the table below and using the 1-aminoadamantane indicated in the second column, there is obtained 1-[3-R¹, 5-R²-(1-adamantylamino)]-3-[(X)ₙ-1(or 2)-naphthyloxy)]-2-propanol wherein (X)ₙ, R¹ and R² represent the substituents on the naphthyl and adamantyl rings, respectively.

| Example | Naphthol | 1-aminoadamantane |
|---|---|---|
| 2 | 4-bromo-1-naphthol | 1-aminoadamantane. |
| 3 | 6-chloro-1-naphthol | Do. |
| 4 | 4-methyl-1-naphthol | Do. |
| 5 | 6,7-dimethyl-1-naphthol | Do. |
| 6 | 5-methoxy-1-naphthol | Do. |
| 7 | 7-dimethylsulfonamido-1-naphthol | Do. |
| 8 | 4-propionyl-1-naphthol | Do. |
| 9 | 5,7-dimethyl-1-naphthol | Do. |
| 10 | 5,8-dichloro-1-naphthol | Do. |
| 11 | 5-dimethylsulfonamido | Do. |
| 12 | 4-chloro-2-naphthol | Do. |
| 13 | 7-methyl-2-naphthol | Do. |
| 14 | 5-acetyl-2-naphthol | Do. |
| 15 | 1-naphthol | 1-amino-3-methyladamantane. |
| 16 | 2-naphthol | 1-amino-3-methoxyadamanatane. |
| 17 | 1-naphthol | 1-amino-3,5-diethyladamantane. |
| 18 | do | 1-amino-3,5-dimethoxyadamantane. |
| 19 | 5,8-dichloro-1-naphthol | 1-amino-3-butyladamantane. |
| 20 | 4-chloro-2-naphthol | 1-amino-3,5-dimethyladamantane. |
| 21 | 6-trifluoromethyl-1-naphthol | 1-amino-3-methyladamantane. |
| 22 | 7-trifluoromethyl-2-naphthol | Do. |

Each of the propanols of Examples 2 to 22 is esterified with acetic anhydride, propionic acid, decanoic acid and phenylacetic acid, respectfully, as described in Example 43 below, to obtain the acetic acid ester, propionic acid ester, decanoic acid ester and phenylacetic acid ester of each.

Following the procedure of Example 1, but substituting for the 1-(2,3-epoxypropoxy)naphthalene in part (b), the substituted compound of the following formula, there is obtained the substituted 1 - (1 - adamantylamino)-3-(1-naphthyloxy)-2-propanol having the same substituents R³, R⁴, R⁵ and R⁶:

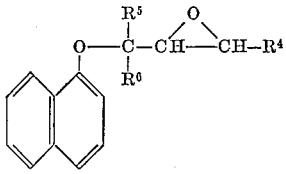

| Example | R⁴ | R⁵ | R⁶ |
|---|---|---|---|
| 23 | H | CH₃ | CH₃ |
| 24 | H | C₂H₅ | H |
| 25 | CH₃ | H | H |
| 26 | CH₃ | CH₃ | CH₃ |
| 27 | CH₃ | C₂H₅ | H |

By utilizing the ring substituted naphthols of Examples 2 to 6, respectively, to prepare the compounds of Examples 23 to 27, respectively, the corresponding R⁴, R⁵, R⁶ substituted products of Formula I are obtained.

EXAMPLE 28

1-(1-adamantylmethylamino)-3-(1-naphthyloxy)-2-propanol (a) 1-adamantane carboxylic acid chloride.—To 18 g. of 1-adamantane carboxylic acid, 50 ml. of thionyl chloride is added with cooling, and the mixture is heated under reflux for 30 minutes. The excess of thionyl chloride is removed in vacuo, the addition of 2× 30 ml. of benzene (benzene dried over silica gel) and evaporation serving to remove the last traces. Anhydrous ether (30 ml.) is added and the solution is evaporated, leaving 1-adamantane carboxylic acid chloride as a brownish white solid;

$\lambda_{max.}^{Nujol}$ 5.61 m$\mu$ (C=O of acid chloride).

(b) 1 - adamantanecarboxamide.—1 - adamantanecarboxylic acid chloride (35 g.) dissolved in 70 ml. of dry tetrahydrofuran, is added to a well-cooled aqueous ammonia solution. A white precipitate appears and the mixture is then stirred for 0.5 hour. The precipitate is filtered, washed with water to neutrality and dried over phosphorus pentoxide in vacuo to give 1-adamantanecarboxamide; M.P. 186–187.5°

$\lambda_{max.}^{Nujol}$ 5.95 m$\mu$ (C=O of amide).

(c) 1-adamantylmethylamine.—To a well stirred suspension of 30 g. of lithium aluminum hydride in 1000 ml. of dry ether, 27 g. (0.15 mole) of 1-adamantane-carboxamide is added in portions over a period of 1.5 hours. After the addition, the reaction mixture is stirred at room temperature for 1 hour and then is refluxed with stirring for 4 hours and finally is allowed to stand overnight at room temperature. The suspension is well-cooled and 50 ml. of water is added dropwise with vigorous stirring. This is followed by the addition of 100 ml. of 10% sodium hydroxide solution. The ethereal layer is separated and the solid is extracted three times with ether. The combined ethereal layer is dried (MgSO₄) and evaporated in vacuo to give 1-adamantylmethylamine as a pale yellow liquid.

(d) 1 - (1 - adamantylmethylamino) - 3 - (1 - naphthyloxy)-2-propanol.—Following the procedure of Example 1, but substituting 1-adamantylmethylamine for the 1-aminoadamantane in part (b) or (c), 1-(1-adamantylmethylamino)-3-(1-naphthyloxy)-2-propanol is obtained.

Similarly by utilizing the following (3-R¹, 5-R²-1-adamantyl)methylamine, produced as in part (a), (b) and (c) above, instead of 1-adamantylmethylamine, the corresponding 1-(3-R¹, 5-R²-1-adamantylmethylamino)-3-(1-naphthyloxy)-2-propanol is obtained:

| Example | R¹ | R² |
|---|---|---|
| 29 | H | CH₃ |
| 30 | H | OCH₃ |
| 31 | C₂H₅ | C₂H₅ |
| 32 | OCH₃ | OCH₃ |
| 33 | H | C₄H₉ |
| 34 | CH₃ | CH₃ |

EXAMPLE 35

1-[N-ethyl-2-(1-adamantyl)ethylamino]-3-(1-naphthyloxy)-2-propanol (a) 1-adamantaneacetic acid.—A solution of 25 g. of 1-bromoadamantane in 100 g. of dichloroethylene is added dropwise during 1.5 hours to 100 ml. of sulfuric acid (90%) containing 18 g. of borontrifluoride at 8–10°. After stirring for 3 hours at 10°, crushed ice is gradually added, and the mixture is diluted with water. The crude precipitate (26.5 g.) is dissolved in 10% sodium hydroxide solution, and the cloudy solution is extracted once with ether. The basic solution is cooled, and acidified with 5% hydrochloric acid. The 1-adamantaneacetic acid that precipitates is collected and dried to give 21.5 g. of white solid, M.P. 130–133°. The analytical sample crystallizes from methanol-water as long white needles, M.P. 134–136°.

(b) 1-adamantaneacetic acid chloride.—To 39 g. of 1-adamantaneacetic acid, 100 ml. of thionyl chloride is added with cooling, and the mixture is heated under reflux for 0.5 hour. The excess of thionyl chloride is removed in vacuo, the addition of 2× 50 ml. of dry benzene and evaporation serving to remove the last traces, yielding 1-adamantaneacetic acid chloride, $\lambda_{max.}^{Nujol}$ 5.6 m$\mu$ (c) 1-adamantaneacetamide.—A solution of 1-adamantaneacetic acid chloride (40 g.) dissolved in 75 ml. of dry tetrahydrofuran, is added to a well-cooled aqueous ammonia solution. A white precipitate appears and the mixture is then stirred for 0.5 hour. The precipitate is filtered, washed with water to neutrality, and dried over phosphorus pentoxide in vacuo to give 1-adamantaneacetamide as white crystals, M.P. 166–168°;

$\lambda_{max.}^{Nujol}$ 5.9 m$\mu$ (d) 1-adamantaneethylamine.—To a well-stirred suspension of 20 g. of lithium aluminum hydride in 500 ml. of dry tetrahydrofuran, 35 g. of 1-adamantaneacetamide dissolved in 1000 ml. of dry tetrahydrofuran is added in portions over a period of 1.5 hours. After the addition, the reaction mixture is stirred at room temperature for 1 hour, and then refluxed with stirring for 4 hours, and finally is allowed to stand overnight at room temperature. The suspension is well-cooled and 50 ml. of water is added dropwise with vigorous stirring. This is followed by the addition of 100 ml. of 10% sodium hydroxide solution. The organic layer is separated and the solid is extracted three times with ether. The combined organic layer is dried (MgSO₄) and evaporated in vacuo to give 24 g. of 1-adamantaneethylamine as a pale yellow liquid. It may be identified as its hydrochloride which separates as white crystals from methanol-ether, M.P. over 280°.

(e) N-[2-(1-adamantyl)ethyl]acetamide.—To a solution of 5 g. of 1-adamantaneethylamine in 100 ml. of benzene and 2.5 g. of pyridine, 2.4 g. of acetyl chloride is added dropwise with cooling. After refluxing for 0.5 hour, the mixture is poured onto 100 ml. of cold water, and the benzene layer is separated. The aqueous layer is extracted once with benzene, and the combined benzene layer is washed successively with water, 5% sodium carbonate solution, 1 N hydrochloric acid, and water. After drying, the benzene layer is evaporated in vacuo to give a thick oil. Trituration with pentane yields N-[2-(1-adamantyl)ethyl]acetamide as a white solid, M.P. 100–103°.

An analytical sample is obtained by two crystallizations from ether, M.P. 114–116°.

(f) N - ethyl - 1 - adamantaneethylamine.—Using the procedure of part (d) above, but substituting N-[2-(1-adamantyl)ethyl]acetamide for 1-adamantaneacetamide, N-ethyl-1-adamantaneethylamine is obtained. It may be identified as its hydrochloride, which separates as white crystals from acetonitrile, M.P. over 280°.

(g) 1 - (N - ethyl - 1 - adamantylethylamino) - 3 - (1-naphthyloxy)-2-propanol.—Following the procedure of Example 1, but substituting N-ethyl-1-adamantylethylamine for the aminoadamantane in part (b) or (c) 1-(N-ethyl - 1 - adamantylethylamino) - 3 - (1 - naphthyloxy)-2-propanol is obtained.

Similarly, by utilizing the following substituted 3-$R^1$, 5-$R^2$-1-bromoadamantanes in place of 1-bromoadamantane in part (a) above and continuing as described, the correspondingly substituted 1-[N-ethyl-2-(3-$R^1$, 5-$R^2$-adamantyl)ethylamino] - 3 - (1-naphthyloxy)-2-propanol is obtained.

| Example | $R^1$ | $R^2$ |
|---|---|---|
| 36 | H | $CH_3$ |
| 37 | H | $OCH_3$ |
| 38 | $C_2H_5$ | $C_2H_5$ |
| 39 | $OCH_3$ | $OCH_3$ |
| 40 | H | $C_4H_9$ |
| 41 | $CH_3$ | $CH_3$ |

Further by utilizing the naphthols of Examples 16 to 21 with the bromoadamantanes of Examples 36 to 4f, respectively, the correspondingly ring substituted products are obtained.

EXAMPLE 42

1-(1-adamantylamino)-3-(1-naphthyloxy)-2-propanol hydrochloride

Dry HCl gas is introduced into a solution of 1 g. of 1-(1-adamantylamino) - 3 - (1 - naphthyloxy)2-propanol in 200 ml. of dry ether. The precipitate is collected and the hydrochloride is crystallized from alcohol-ether.

EXAMPLE 43

1-(1-adamantylamino)-3-(1-naphthyloxy)-2-propyl acetate

A mixture of 3 g. of 1 - (1 - adamantylamino) - 3 - (1-naphthyloxy)-2-propanol, 1.5 g. of fused sodium acetate and 15 ml. of acetic anhydride is heated on a steam bath, with occasional shaking for 1 hour. At the end of this time the warm solution is poured, with vigorous stirring, into 100 ml. of ice water. The mixture is stirred for 10–15 minutes and the crystals are collected, washed thoroughly with water, and purified by recrystallization from alcohol.

What is claimed is:

1. A compound of the formula wherein

X is hydrogen, halogen, lower alkyl, halo-lower alkyl, lower alkoxy, lower alkanoyl or dimethylsulfonamido, $R^1$ and $R^2$ each is hydrogen, lower alkyl or lower alkoxy, $R^3$ is hydrogen, lower alkyl or phenyl-lower alkyl, $R^4$, $R^5$ and $R^6$ each is hydrogen or lower alkyl, $R^7$ is hydrogen or the acyl radical of a hydrocarbon carboxylic acid of less than 14 carbon atoms, m is 0, 1 or 2, and n is 1 or 2, and acid addition salts thereof.

2. A compound as in claim 1 wherein X, $R^1$ to $R^6$ are all hydrogen, m is 0 and $R^7$ is lower alkanoyl.

3. A compound as in claim 1 wherein X, $R^1$ to $R^6$ are all hydrogen, m is 1 and $R^7$ is lower alkanoyl.

4. A compound as in claim 1 wherein X, $R^1$ to $R^6$ are all hydrogen, m is 2 and $R^7$ is lower alkanoyl.

5. A compound as in claim 1 wherein X, $R^2$ to $R^7$ are all hydrogen, m is 0 and $R^1$ is lower alkyl.

6. A compound as in claim 1 wherein X, $R^1$ to $R^7$ are all hydrogen, m is 0 and the ring attachment is in the 1-position.

7. Acid addition salt of the compound of claim 6.

8. A compound as in claim 1 wherein X, $R^1$ to $R^7$ are all hydrogen, m is 1 and the ring attachment is in the 1-position.

9. A compound as in claim 1 wherein X, $R^1$, $R^2$, $R^4$ to $R^7$ are all hydrogen, m is 2, $R^3$ is ethyl and the ring attachment is in the 1-position.

10. A compound as in claim 2 wherein X, $R^1$ to $R^6$ are all hydrogen, m is 0, $R^7$ is acetyl and the ring attachment is in the 1-position.

References Cited

UNITED STATES PATENTS 3,337,628 8/1967 Crowther et al. _____ 260—570.7
3,432,545 3/1969 Howe _____ 260—570.7

LORRAINE A. WEINBERGER, Primary Examiner

V. GARNER, Assistant Examiner

U.S. Cl. X.R.

260—570.7, 501.18, 556, 476, 410, 468, 514, 544, 557; 424—299, 308, 311, 312, 330